(12) United States Patent
Lee

(10) Patent No.: US 12,128,965 B2
(45) Date of Patent: Oct. 29, 2024

(54) STEERING CONTROL DEVICE AND METHOD

(71) Applicant: HL MANDO CORPORATION, Gyeonggi-do (KR)

(72) Inventor: KwangHyung Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 190 days.

(21) Appl. No.: 18/094,345

(22) Filed: Jan. 7, 2023

(65) Prior Publication Data

US 2023/0219615 A1 Jul. 13, 2023

(30) Foreign Application Priority Data

Jan. 10, 2022 (KR) .................. 10-2022-0003331

(51) Int. Cl.
*B62D 5/00* (2006.01)
*B62D 5/04* (2006.01)
*B62D 6/00* (2006.01)

(52) U.S. Cl.
CPC ............. *B62D 5/006* (2013.01); *B62D 5/003* (2013.01); *B62D 6/008* (2013.01)

(58) Field of Classification Search
CPC ........ B62D 5/003; B62D 5/005; B62D 5/006; B62D 5/0409; B62D 5/0412; B62D 5/0415; B62D 5/0481; B62D 5/0484; B62D 5/0487; B62D 6/008

USPC ........................................ 701/41, 43
See application file for complete search history.

(56) References Cited

U.S. PATENT DOCUMENTS

| | | | |
|---|---|---|---|
| 2017/0259846 A1* | 9/2017 | Koseki | H02P 29/68 |
| 2018/0178830 A1* | 6/2018 | Koseki | H02H 3/162 |
| 2020/0247462 A1* | 8/2020 | Akutsu | H02P 29/028 |
| 2020/0247464 A1* | 8/2020 | Koikegami | H03K 17/0822 |
| 2021/0044239 A1* | 2/2021 | McLean | H02K 3/28 |
| 2022/0045642 A1* | 2/2022 | Koseki | H02M 1/32 |
| 2023/0192185 A1* | 6/2023 | Kim | B62D 5/006 |
| | | | 701/41 |
| 2023/0198451 A1* | 6/2023 | Kim | H02P 29/20 |
| | | | 318/490 |

* cited by examiner

*Primary Examiner* — Erick R Solis
(74) *Attorney, Agent, or Firm* — Womble Bond Dickinson (US) LLP

(57) ABSTRACT

The disclosure relates to a steering control device and method. Specifically, according to the disclosure, a steering control device comprises a first steering control module controlling a first reaction force motor to generate a reaction force torque for a steering wheel through a first inverter and a second steering control module controlling a second reaction force motor to generate a reaction force torque for the steering wheel through a second inverter. The first steering control module or the second steering control module generates the reaction force torque by conducting one of the first inverter and the second inverter when the first inverter and the second inverter fail.

16 Claims, 8 Drawing Sheets

STEERING CONTROL DEVICE AND METHOD

CROSS-REFERENCE TO RELATED APPLICATION

This application claims priority from Korean Patent Application No. 10-2022-0003331, filed on Jan. 10, 2022, which is hereby incorporated by reference for all purposes as if fully set forth herein.

BACKGROUND

Field

The present embodiments relate to a steering control device and method for controlling a steering motor.

Description of Related Art

Nowadays, the development of vehicle safety control systems is rapidly growing according to the demand of consumers. Such a safety system is applied to various fields, such as steering, braking, and suspension, and has recently been implemented in various ways using electronic components.

In particular, in steering assist systems that assist steering of vehicles, increasing interest switches from systems conventionally using a single controller for controlling the vehicle to redundant system-applied steering assist systems adopting two or more controllers to control vehicle steering. A redundant system is equipped with two or more controllers to, when one controller fails, perform the control operation with the other controller, providing high driving stability.

Meanwhile, to reduce weight in vehicles, steer-by-wire (SBW) systems have been developed which electrically connect the steering shaft (or column), including the steering wheel and the reaction force motor, with the actuator, including the wheels and rack bar, and transmit the driver's steering force.

In a context where a vehicle is operated by applying a redundant system to the above-described SbW system, the plurality of controllers all may fail. When the plurality of controllers fail, the reaction force of the steering wheel may disappear, resulting in unstable driving.

Therefore, a need exists for a method for providing a reaction force to the steering wheel when the plurality of controllers fails.

BRIEF SUMMARY

In the foregoing background, the disclosure provides a steering control device and method that provides reaction force to the steering wheel by conducting an inverter a portion of which fails, with the failed portion fixed.

To achieve the foregoing objectives, in an aspect, the disclosure provides a steering control device comprising a first steering control module controlling a first reaction force motor to generate a reaction force torque for a steering wheel through a first inverter and a second steering control module controlling a second reaction force motor to generate a reaction force torque for the steering wheel through a second inverter, wherein the first steering control module or the second steering control module generates the reaction force torque by conducting one of the first inverter and the second inverter when the first inverter and the second inverter fail.

In another aspect, the disclosure provides a steering control method comprising a failure detection step detecting a failure in a first steering control module and a second steering control module and a reaction force torque generation step generating a reaction force torque to for a steering wheel by conducting one of a first inverter and a second inverter when a cause of the failure in the first steering control module and the second steering control module occurs in a first inverter and a second inverter controlling a first reaction force motor or a second reaction force motor.

Effects of the Disclosure

As described above, according to the disclosure, the steering control device and method may generate a reaction force torque to the steering wheel by controlling a non-failed switching element when the reaction force motor cannot be controlled due to failure in both the inverters, thereby providing a steering feeling to the driver.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
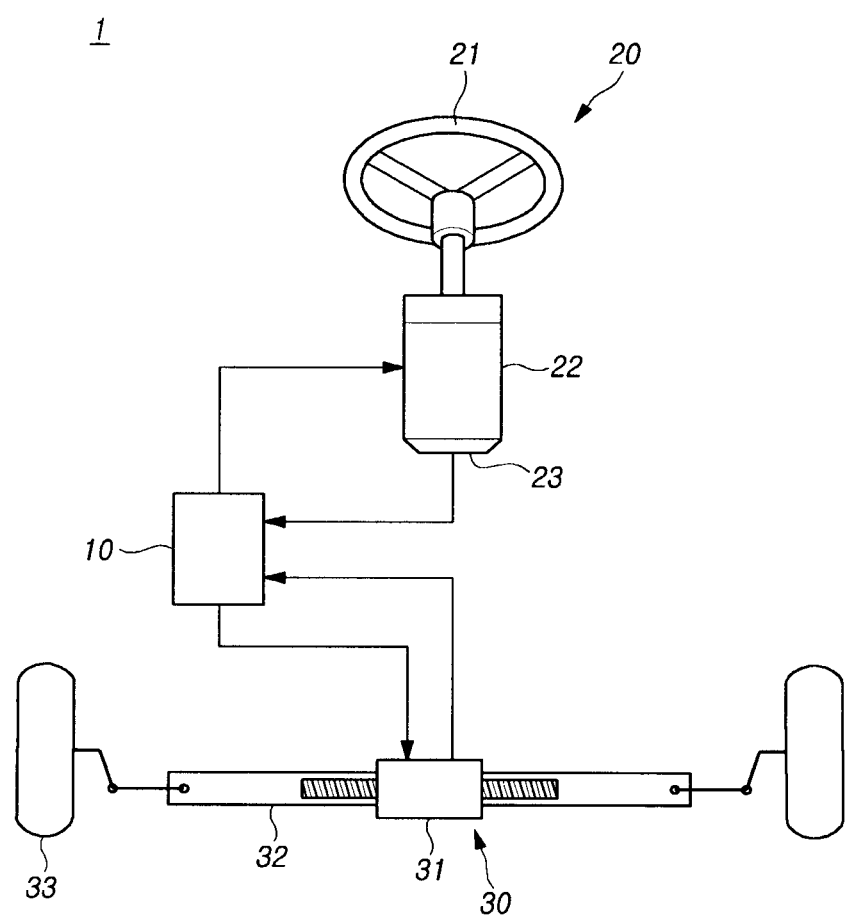
FIG. 1 is a view illustrating a steering control system according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view illustrating a steering control system according to an embodiment.

Referring to FIG. 1, a steering control system 1 may include a steering input actuator 20, a steering control device 10, and a steering output actuator 30. As described above, if the steering control system 1 is an SbW system, the steering input actuator 20 and the steering output actuator 30 may be mechanically separated from each other.

The steering input actuator 20 may mean a device to which steering information intended by the driver is inputted. As described above, the steering input actuator 20 may include a steering wheel 21, a steering shaft 22, and a reaction force motor 23. Although not shown, the steering angle information may further include a steering gear for transferring the rotational force of the reaction force motor 23 to the steering shaft 22.

The reaction force motor 23 may receive a control signal (or referred to as a 'command current') from the steering controller 10 and apply a reaction force to the steering wheel 21. Specifically, the steering motor 23 may receive a command current from the steering control device 10, drive at a rotation speed indicated by the command current to generate reaction torque, and transfer the generated reaction torque to the steering wheel through the steering gear. The reaction force motor 23 may be configured of a redundant system to be described below. Accordingly, the reaction force motor 23 may include a first reaction force motor 23-1 and a second reaction force motor (not shown).

The steering control device 10 may receive steering information from the steering input actuator 20, calculate a control value, and output an electrical signal indicating the control value to the steering output actuator 30. The steering information may mean information including at least one of a steering angle or driver's torque.

Meanwhile, the steering control device 10 may receive, as feedback, power information actually output from the steering output actuator 30, calculate a control value, and output an electrical signal indicating the control value to the steering input actuator 20, providing the driver with a steering sensation (steering feeling).

The steering output actuator 30 may mean a device that actually drives the steering of the host vehicle. The steering output actuator 30 may include a steering motor 31, a rack 122, a wheel 123, a vehicle velocity sensor, and a rack position sensor.

The steering input actuator 20 and the steering output actuator 30 may further include a motor torque sensor capable of detecting the motor torque of the steering motor 23 and the steering motor 31.

The steering motor 31 may axially move the rack 122. Specifically, the steering motor 31 may receive a command current from the steering controller 10 and thus drive, and may allow the rack 122 to linearly move in the axial direction.

As driven by the steering motor 31, the rack 122 may perform a linear motion which allows the wheels 123 to turn to the left or right.

Although not shown, the steering control system 1 according to the disclosure may further include, e.g., a clutch for separating or connecting the steering input actuator 20 and the steering output actuator 30. The clutch may be operated by the control of the steering control device 10.

If the steering control system 1 according to the disclosure is an SbW system, and the host vehicle travels in an autonomous vehicle mode, the steering control system 1 according to the disclosure may control only the steering output actuator 30 to perform steering control on the host vehicle or may control both the steering input actuator 20 and the steering output actuator 30 to perform steering control on the host vehicle.

A steering control device 10 is described below with reference to the accompanying drawings, according to an embodiment of the disclosure.

Figure 2:
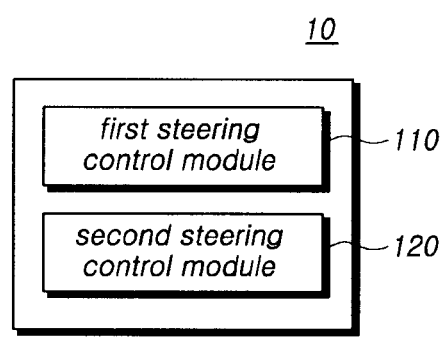
FIG. 2 is a block diagram illustrating an steering control device according to an embodiment of the disclosure.

FIG. 2 is a block diagram illustrating a steering control device 10 according to an embodiment of the disclosure.

Referring to FIG. 2, the steering control device 10 according to the disclosure may include a first steering control module 110 and a second steering control module 120.

More specifically, according to the disclosure, a steering control device 10 may comprise a first steering control module 110 controlling a first reaction force motor 23-1 to generate a reaction force torque for a steering wheel through a first inverter and a second steering control module 120 controlling a second reaction force motor to generate a reaction force torque for the steering wheel 21 through a second inverter 123-2. The first steering control module 110 or the second steering control module 120 may generate the reaction force torque by conducting one of the first inverter 123-2 and the second inverter 113-2 when the first inverter and the second inverter fail.

According to an embodiment of the disclosure, the steering control device may be an advance driver assistance system (ADAS) that provides information helpful for driving the host vehicle or assists the driver in the host vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

The host vehicle may refer to a vehicle that is equipped with a prime mover to roll the wheels by the power there-from to move on the ground without a pre-built railway or track. Further, the host vehicle may be an electric vehicle that is an electricity-powered vehicle that obtains driving energy by rotating a motor with electricity from a battery rather than obtaining driving energy from combustion of a fossil fuel.

The steering control device may be equipped in a manned vehicle, which a drive is aboard to control the host vehicle or an autonomous vehicle.

The steering control device 10 may be configured as a redundant system to control vehicle steering through the first steering control module 110 or the second steering control module 120. Upon determining that the first steering control module 110 fails and cannot fully perform its role, the steering control device 10 may transfer the control right to the second steering control module 120 to allow the second steering control module 120 to control vehicle steering.

Figure 3:
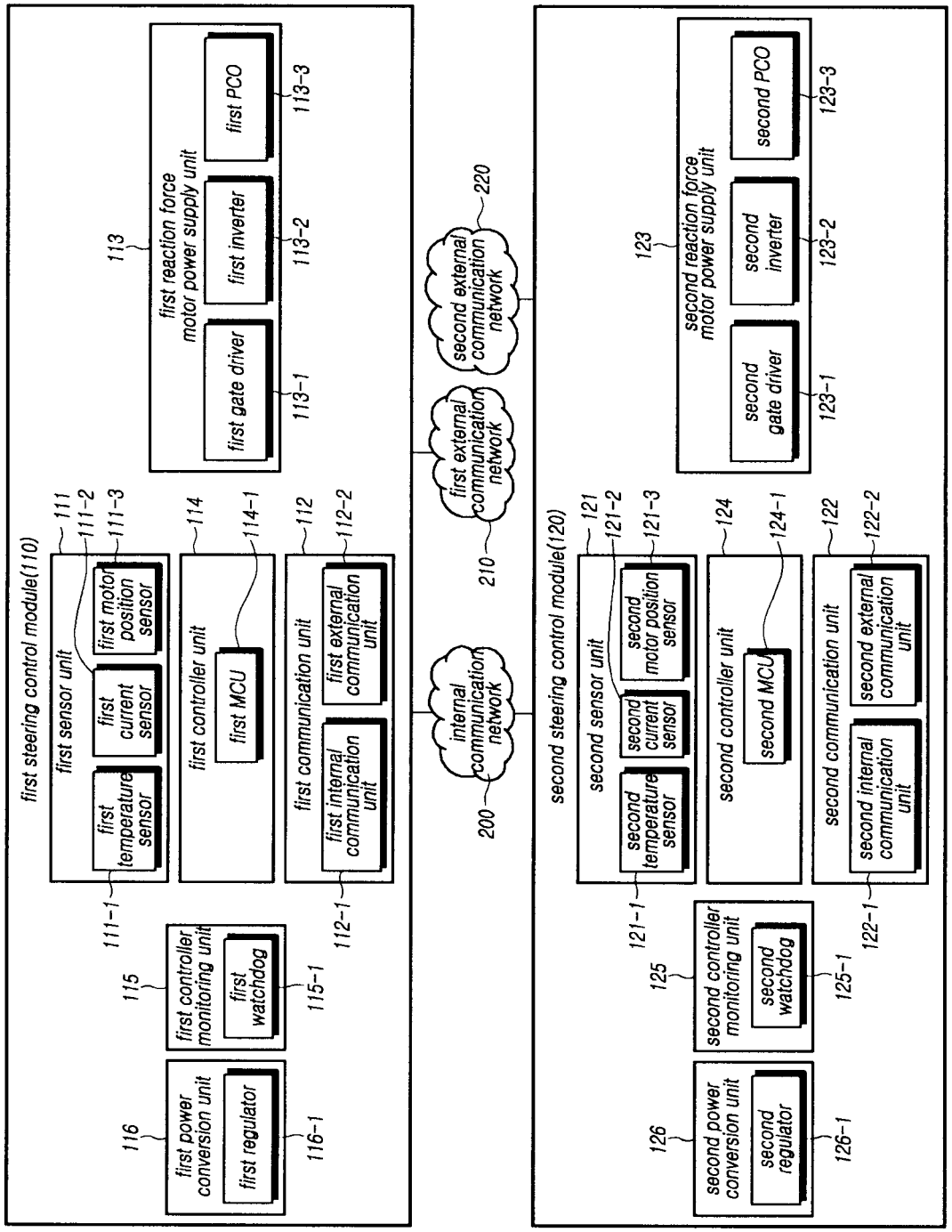
FIG. 3 is a block diagram illustrating, in detail, a first steering control module and a second steering control module according to an embodiment.

FIG. 3 is a block diagram illustrating, in detail, a first steering control module 110 and a second steering control module 120 according to an embodiment.

Referring to FIG. 3, a first steering control module 110 may include a first sensor unit 111, a first communication unit 112, a first reaction force motor power supply unit 113, a first controller unit 114, a first controller monitoring unit 115, and a first power conversion unit 116.

The second steering control module 120 may include a second sensor unit 121, a second communication unit 122, a second reaction force motor power supply unit 123, a second controller unit 124, a second controller monitoring unit 125, and a second power conversion unit 126.

In particular, the first sensor unit 111, the first communication unit 112, the first reaction force motor power supply unit 113, the first controller unit 114, the first controller monitoring unit 115, and the first power conversion unit 116 of the first steering control module 110 are identical to the second sensor unit 121, the second communication unit 122, the second reaction force motor power supply unit 123, the second controller unit 125, and the second power conversion unit 126, respectively. Thus, for brevity of description, the following description focuses primarily on components of the first steering control module 110.

The first sensor unit 111 may include, but is not limited to, a first temperature sensor 111-1, a first current sensor 111-2, and a first motor position sensor 111-3 but, without limitations thereto, may include any sensor capable of measuring the state for the vehicle steering device.

The first temperature sensor 111-1 may measure the temperature of the first steering control module 110. The first temperature sensor 111-1 may obtain first temperature information based on the measured temperature of the first steering control module 110. The first temperature sensor 111-1 may be connected to the first controller unit 114. The first temperature sensor may provide the obtained first temperature information to the first controller unit 114.

The first current sensor 111-2 may measure a first assist current between the first reaction force motor power supply unit 113 and the steering motor 31. The first current sensor 111-2 may obtain first assist current information based on the measured first assist current. The first current sensor 111-2 may be connected to the first controller unit 114. The first current sensor 111-2 may provide the obtained first assist current information to the first controller unit 114.

The first motor position sensor 111-3 may measure the position of the steering motor 31. The first motor position sensor 111-3 may obtain first motor position information based on the measured position of the steering motor 31. The first motor position sensor 111-3 may be connected to the first controller unit 114. The first motor position sensor 111-3 may provide the obtained first motor position information to the first controller unit 114.

The first communication unit 112 may include a first internal communication unit 112-1 and a first external communication unit 112-2.

The first internal communication unit 112-1 may be connected to the second internal communication unit 122-1 of the second steering control module 120 through an internal communication network 200. In other words, the first internal communication unit 112-1 and the second internal communication unit 122-1 may be connected to each other through the internal communication network 200, transmitting/receiving information to/from the first steering control module 110 and the second steering control module 120.

The first internal communication unit 112-1 may be connected to the first controller unit 114. In other words, the first internal communication unit 112-1 may provide the information (e.g., operation state information about the second steering control module 120) received from the second steering control module 120 to the first controller unit 114 through the internal communication network 200. The first internal communication unit 112-1 may provide the information (e.g., operation state information about the first steering control module 110) received from the first controller unit 114 to the second internal communication unit 122-1 through the internal communication network 200.

The first external communication unit 112-2 may be connected to the vehicle through the first external communication network 210. In other words, the first external communication unit 112-2 and the vehicle may be connected to each other through the first external communication network 210 and may transmit/receive information about the first steering control module 110 and the vehicle to/from each other. For example, the first external communication unit 112-2 may provide the information (e.g., vehicle state information) provided from the vehicle to the first controller unit 114 through the first external communication network 210. The first external communication unit 112-2 may provide the information (e.g., operation state information about the first steering control module 110) provided from the first controller unit 114 to the vehicle through the first external communication network 210.

The first internal communication unit 112-1 and the second external communication unit 112-2 may include at least one of wired and wireless communicators. In particular, the first internal communication unit 112-1 and the second external communication unit 112-2 may include a control area network (CAN) communicator but, without limitations thereto, may include any communicator capable of connecting each steering control module with the vehicle.

The first reaction force motor power supply unit 113 may include a first gate driver 113-1, a first inverter 113-2, and a first phase disconnector (PCO) 113-3.

The first gate driver 113-1 may be connected to the first controller unit 114. The first gate driver 113-1 may receive a first gate signal from the first controller unit 114. The first gate driver 113-1 may be connected to the first inverter 113-2. The first gate driver 113-1 may provide the first gate signal received from the first controller unit 114 to the first inverter 113-2.

The first inverter 113-2 may be connected to a voltage supply module. The first inverter 113-2 may receive a first DC voltage from the voltage supply module. The first inverter 113-2 may be connected to the first gate driver 113-1. The first inverter 113-2 may receive a first gate signal from the first gate driver 113-1.

The first inverter 113-2 is a DC-AC converter and may modulate the first DC voltage provided from the voltage supply module according to the first gate signal provided from the first gate driver 113-1 to generate a first assist current.

The first inverter 113-2 may include a three-phase inverter, but without limitations thereto, be modified depending on the steering motor and power source.

The first phase cut off circuit (PCO) 113-3 may be connected to the first inverter 113-2. The first PCO 113-3 may receive the first assist current from the first inverter 113-2.

The first PCO 113-3 may supply or cut off the first assist current received from the first inverter 113-2 through an on-off operation. In other words, the first PCO 113-3 may be connected to the steering motor 31. The first PCO 113-3 may supply or cut off the first assist current provided from the first inverter 113-2 to the steering motor 31.

The PCO is an element or circuit capable of cutting off a phase, and may include at least one of a switch, a circuit breaker, or a disconnecting switch but, without limitations thereto, may include any element or circuit that may cut off a phase.

As described above, the vehicle steering device according to the present embodiments may share one steering motor through each PCO, thereby separating each inverter through each PCO and hence increasing the redundancy and reliability of the vehicle.

The first controller unit 114 may be connected to the first sensor unit 111, the first communication unit 112, the first reaction force motor power supply unit 113, the first controller monitoring unit 115, and the first power conversion unit 116. The first controller unit 114 may control the operations of the first sensor unit 111, the first communication unit 112, the first reaction force motor power supply unit 113, the first controller monitoring unit 115, and the first power conversion unit 116.

For example, the first controller unit 114 may generate a first gate signal based on the steering wheel torque information received from at least one first steering torque sensor 410, steering wheel steering angle information received from at least one first steering angle sensor 510, the first temperature information, first assist current information and first motor position information received from the first sensor unit 111, and the vehicle state information (e.g., vehicle velocity information) received from the first communication unit 112 and provide the generated first gate signal to the first gate driver 113-1 to control the first assist current of the first inverter 113-2.

The first gate signal may be generated by a preset modulation scheme. In particular, the preset modulation scheme may include at least one voltage modulation scheme among a pulse width modulation scheme, an optimal voltage modulation scheme, a triangular comparison voltage modulation scheme, and a space vector voltage modulation scheme, but without limitations thereto, may include any scheme capable of generating a gate signal for controlling the operation of the inverter.

The first controller unit 114 may include a first microcontroller unit (MCU) 114-1 but, without limitations thereto, may include any device (or computer) that may process (or execute or compute) programs.

The first controller monitoring unit 115 may be connected to the first controller unit 114. The first controller monitoring unit 115 may monitor the operation state of the first controller unit 114. For example, the first controller unit 114 may provide a first watchdog signal to the first controller monitoring unit 115. The first controller monitoring unit 115 may be cleared or generate a first reset signal based on the first watchdog signal provided from the first controller unit 114.

When the first controller monitoring unit 115 is cleared, it may mean that the first controller unit 114 is operating normally. When the first controller monitoring unit 115 generates the first reset signal and provides it to the first controller unit 114, it may mean that the first controller unit 114 is operating abnormally, and the first controller unit 114 may be reset by the first reset signal.

The first watchdog signal may be a signal where the first controller monitoring unit 115 periodically monitors the operation of the first controller unit 114 (e.g., a signal to disable reset). In other words, the first watchdog signal may be a signal capable of identifying that the program currently executed by the first controller unit 114 is alive.

The first controller monitoring unit 115 may include a first watchdog 115-1, but without limitations thereto, may include any device capable of monitoring the first controller unit 114. The first watchdog 115-1 may include a first window watchdog having a deadline, that is, a start and an end.

The first power conversion unit 116 may be connected to the power supply module. The first power conversion unit 116 may receive a first DC voltage from the power supply module. The first power conversion unit 116 may convert the first DC voltage provided from the power supply module to a voltage to generate at least one first operating voltage.

The first power conversion unit 116 may be connected to the first sensor unit 111, the first communication unit 112, the first reaction force motor power supply unit 113, the first controller unit 114, and the first controller monitoring unit 115. The first power conversion unit 116 may provide at least one generated first operating voltage to the first sensor unit 111, the first communication unit 112, the first reaction force motor power supply unit 113, the first controller unit 114, and the first controller monitoring unit 115.

The first operating voltage may be a voltage capable of operating the first sensor unit 111, the first communication unit 112, the first reaction force motor power supply unit 113, the first controller unit 114, and the first controller monitoring unit 115. Accordingly, there may be a plurality of first operating voltages and be modified and generated depending on the operating voltages of the first sensor unit 111, the first communication unit 112, the first reaction force motor power supply unit 113, the first controller unit 114, and the first controller monitoring unit 115.

The first power conversion unit 116 may include a DC-DC converter. The DC-DC converter may include a buck converter, but without limitations thereto, may include any converter capable of receiving the first DC voltage and converting it into a first operating voltage lower than the first DC voltage.

The first power conversion unit 116 may include a first regulator 116-1. The first regulator 116-1 may receive the first DC voltage and convert it into a first operating voltage lower than the received first DC voltage.

The second steering control module 120 may monitor the operation state of the first steering control module 110 currently controlling the steering motor via the internal communication network 200 and, when the operation state of the first steering control module 110 is abnormal as a result of the monitoring, control the steering motor 31 using at least one of the second sensor unit 121, the second communication unit 122, the second reaction force motor power supply unit 123, the second controller unit 124, the second controller monitoring unit 125, and the second power conversion unit 126.

For example, the second steering control module 120 may monitor the operation state of the first steering control module 110 currently controlling the steering motor through the internal communication network 200 and, when the operation state of the first steering control module 110 is abnormal as a result of the monitoring, that is, when at least one of at least one of the first motor position information, the first temperature information, or the first assist current information from the first sensor unit 111, the vehicle state information from the first communication unit 112, the first assist current of the first reaction force motor power supply unit 113, the first gate signal of the first controller unit 114, the first watchdog signal of the first controller monitoring unit 115, or the first operating voltage of the first power conversion unit 116 is abnormal, control the reaction force motor 23 using at least one of the second sensor unit 121, the second communication unit 122, the second reaction force motor power supply unit 123, the second controller unit 124, the second controller monitoring unit 125, or the second power conversion unit, which perform the same functions as those of the first sensor unit 111, the first communication unit 112, the first reaction force motor power supply unit 113, the first controller unit 114, the first controller monitoring unit 115, and the first power conversion unit 116, that is, using at least one of at least one of the second motor position information, second temperature information, or the second assist current information from the second sensor unit 121, the vehicle state information from the second communication unit 122, the second assist current of the second reaction force motor power supply unit 123, the second gate signal of the second controller unit 124, the second watchdog signal of the second controller monitoring unit 125, or the second operating voltage of the second power conversion unit 126.

According to the present embodiments, the power supply module may include a direct current (DC) power source and a power path conversion unit.

The DC power source may provide a DC voltage. The DC voltage may include a first DC voltage and a second DC voltage. In particular, the first DC voltage and the second DC voltage may have the same DC voltage.

The DC power source may provide the first DC voltage to the first steering control module 110. In particular, the first DC voltage may be provided to the first regulator 116-1 of the first power conversion unit 116 and the first inverter 113-2 of the first reaction force motor power supply unit 113.

The DC power source may provide the second DC voltage to the second steering control module 120. In particular, the second DC voltage may be provided to the second regulator 126-1 of the second power conversion unit 126 and the second inverter 123-2 of the second reaction force motor power supply unit 123.

According to the present embodiments, the power supply module may further include a power path conversion unit. The power path conversion unit may be connected to the DC power source. The power path conversion unit may receive DC voltage from the DC power source. In particular, the power path conversion unit may receive the first DC voltage and the second DC voltage from the DC power source.

The power path conversion unit may receive the first DC voltage and the second DC voltage from the DC power source and control the power path to provide the first DC voltage to the first steering control module 110 (i.e., the first regulator 116-1 of the first power conversion unit 116 and the first inverter 113-2 of the first reaction force motor power supply unit 113) and the second DC voltage to the second steering control module 120 (i.e., the second regulator 126-1 of the second power conversion unit 126 and the second inverter 123-2 of the second reaction force motor power supply unit 123).

Meanwhile, the second steering control module 120 may monitor the operation state of the first steering control module 110 currently controlling the steering motor through the internal communication network 200 and, if the first DC voltage supplied from the DC power source (or power path conversion unit) to the first steering control module 110 is abnormal as a result of monitoring, receive the second DC voltage from the DC power source (or power path conversion unit) and control the steering motor 31 based thereon.

In the following description, it is assumed that the steering control device 10 according to the disclosure operates under the redundant system constituted of two steering control modules, two inverters, and two reaction force motors as described above.

Figure 4:
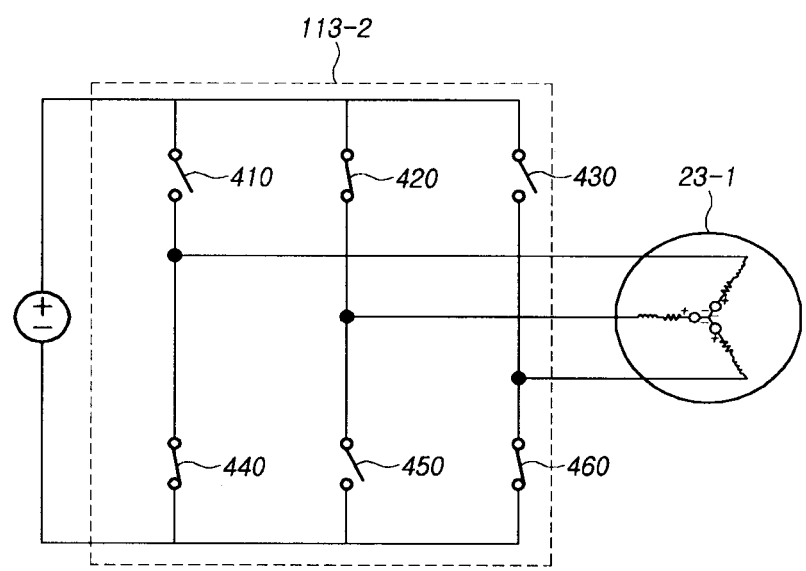
FIGS. 4 and 5 are views illustrating an example of conducting a first inverter when the first inverter fails according to an embodiment.
Figure 5:
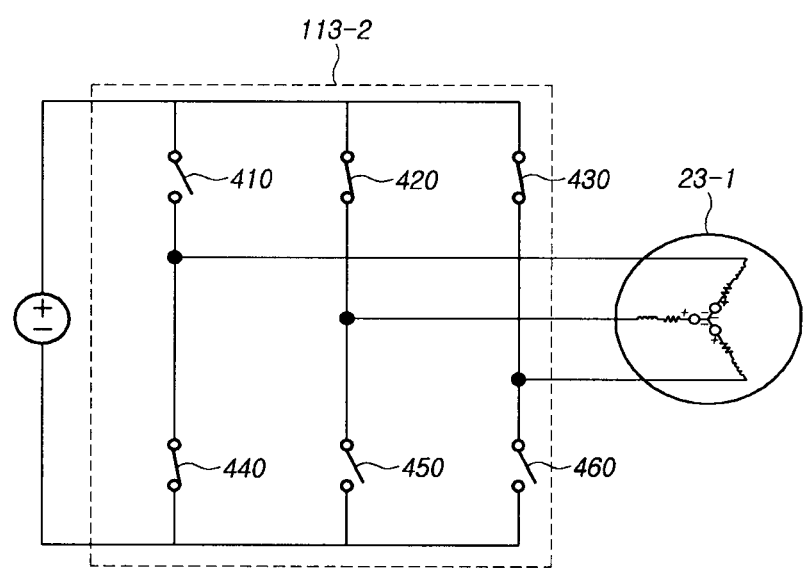

FIGS. 4 and 5 are views illustrating an example of conducting a first inverter 113-2 when the first inverter 113-2 fails according to an embodiment.

Referring to FIG. 4, the first steering control module 110 may generate a reaction force by conducting one of the first inverter 113-2 and the second inverter 123-2 when the first inverter 113-2 and the second inverter 123-2 fail.

In the case of a general SbW-based steering system, if the first inverter 113-2 fails, the first reaction force motor 23-1 may not be controlled. If the steering system has a redundant system, the control right is transferred to the second steering control module 120 due to failure in the first steering control module 110, and the second steering control module 120 may control the second reaction force motor through the second inverter 123-2 to generate a reaction force torque corresponding to the rotation of the steering wheel 21.

If the second inverter 123-2 also fails, the second reaction force motor may also stop functioning, so that reaction force torque may be no longer provided to the steering wheel 21. In SbW, if reaction force torque cannot be provided to the steering wheel, the steering wheel may be rotated easily with small force, so that the vehicle may have an accident.

To prevent such context, in the disclosure, when both the first inverter 113-2 and the second inverter 123-2 fail, reaction force torque may be generated by conducting any one of the two inverters.

Referring to FIG. 4, the first inverter 113-2 may include a first high-side switching element 410 and a first low-side switching element 440 connected to the U phase of the first reaction force motor 23-1, a second high-side switching element 420 and a second low-side switching element 450 connected to the V phase of the steering motor, and a third high-side switching element 430 and a third low-side switching element 460 connected to the W phase of the steering motor. The second inverter 123-2 has the same structure by the nature of the redundant system and may include a fourth high-side switching element and a fourth low-side switching element connected to the U phase of the second reaction force motor, a fifth high-side switching element and a fifth low-side switching element connected to the V phase of the steering motor, and a sixth high-side switching element and a sixth low-side switching element connected to the W phase of the steering motor.

As shown in FIG. 4, as the first high-side switching element 410 is fixed in an opened state and is thus not controlled any longer, the first steering control module 110 may determine it as a failure. In other words, when at least one of the plurality of switching elements included in the first inverter 113-2 fails, the first steering control module 110 may determine that the first inverter 113-2 fails. Here, the switching element may mean a switching element configured as a field effect transistor (FET).

As an example, the first steering control module 110 may generate a reaction force torque by controlling at least one of the switching elements of the remaining phases with respect to the failed switching element. For example, when the first high-side switching element 410 fails, the first steering control module 110 may control at least one of the second high-side switching element 420 and the third high-side switching element 430 to conduct the first inverter 113-2. In other words, the first steering control module 110 may control the switching elements of the remaining phases while leaving the first high-side switching element 410 which is no longer controlled, as it is, allowing the first reaction force motor 23-1 to generate reaction force torque.

For example, control according to the position of the motor may be required for the first steering control module 110 to control the switching elements of the remaining phases to generate reaction force torque. Specifically, when the first high-side switching element 410 fails in an opened state, the first steering control module 110 may control the first low-side switching element 440 in a shorted state and control the switching operation of at least one of the second high-side switching element 420 and the third high-side switching element 430 to conduct the first inverter 113-2. In contrast, when the first high-side switching element 410 fails in the shorted state, the first steering control module 110 may control the switching operation of at least one of the second low-side switching element 450 and the third low-side switching element 460 to conduct the first inverter 113-2.

Since reaction force torque is differently generated depending on the motor scheme (IPM/SPM, pol pair etc.) and the position of the rotor, the first steering control device 10 may control the first inverter 113-2 based on a preset pulse width modulation (PWM) to provide an appropriate steering feeling according to rotation of the steering wheel 21 to the driver. To that end, the steering control device 10 may further include a motor position sensor to detect the position of the motor. Here, the preset PWM may be set based on the vehicle velocity. In other words, a different reaction force torque may be generated from the reaction force motor depending on the vehicle velocity.

As described above, the disclosure may generate a reaction force torque by the reaction force motor even when the first inverter 113-2 and the second inverter 123-2 fail, providing a reaction force torque to the steering wheel.

Referring to FIG. 5, the first steering control device 10 may generate a higher reaction force torque by adding an FET conduction path Path. Specifically, in a context where the first high-side switching element 410 of FIG. 5 fails, if the second high-side switching element 420 is turned on, the inverter may be conducted, generating a reaction force torque from the reaction force motor. When a larger reaction force torque is required for the steering wheel, a larger reaction force torque may be generated by further turning on the third high-side switching element 430. The control of the first steering control device 10 may be performed within a range of not damaging the plurality of switching elements constituting the first inverter 113-2, the first reaction force motor 23-1, and the printed circuit board (PCB) where the elements are mounted.

Figure 6:
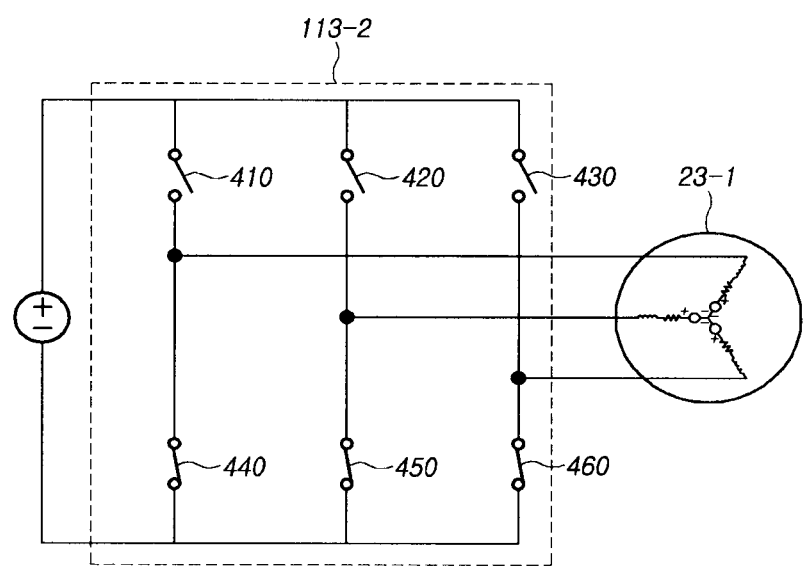
FIG. 6 is a view illustrating an example of generating a reaction force torque without conducting a first inverter according to an embodiment.

FIG. 6 is a view illustrating an example of generating a reaction force torque without conducting a first inverter 113-2 according to an embodiment.

Referring to FIG. 6, the first steering control module 110 may control the switching element of the remaining phases positioned at the same end with respect to the failed switching element, generating reaction force torque. In other words, the first steering control module 110 may control the end where the failed switching element is positioned in the shorted state, generating reaction force torque. For example, when the first high-side switching element 410 is not controlled in the shorted state due to failure, the first steering control module 110 may control the switching operation to allow the second high-side switching element 420 and the third high-side switching element 430 to be shorted, generating reaction force torque through counter electromotive force of the reaction force motor itself. In contrast, when the first low-side switching element 440 is not controlled in the shorted state due to failure, the first steering control module 110 may control the switching operation to allow the second low-side switching element 450 and the third low-side switching element 460 to be shorted, generating reaction force torque through counter electromotive force of the reaction force motor itself.

Although it has been described above that two steering control modules control two reaction force motors through two inverters, the steering control device 10 according to the disclosure may be implemented as one reaction force motor through two inverters in two steering control modules as long as the reaction force motor does not fail.

As described above, the disclosure may provide an appropriate reaction force feeling to the steering wheel by generating a larger reaction force torque.

As described above, the steering control device of the disclosure may generate a reaction force torque to the steering wheel by controlling a non-failed switching element when the reaction force motor cannot be controlled due to failure in both the inverters, thereby providing a steering feeling to the driver.

The steering control device 10 may be implemented as, e.g., an electronic control unit (ECU).

According to an embodiment, a computer system (not shown), such as the steering control device 10, may be implemented as an electronic control unit. The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the steering control device 10 capable of performing the above-described embodiments of the disclosure.

Figure 7:
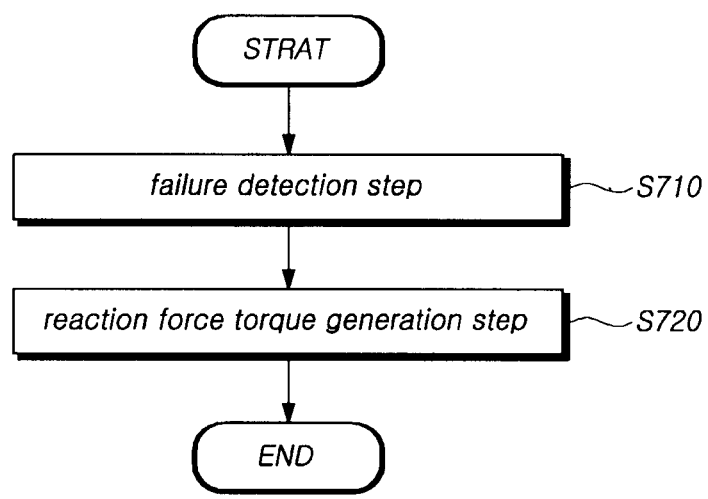
FIG. 7 is a flowchart illustrating a steering control method according to an embodiment of the disclosure.

FIG. 7 is a flowchart illustrating a steering control method according to an embodiment of the disclosure.

Referring to FIG. 7, according to the disclosure, a steering control method may comprise a failure detection step S710 of detecting a failure in a first steering control module 110 and a second steering control module 120 and a reaction force torque generation step S720 generating a reaction force torque to for a steering wheel by conducting one of a first inverter 113-2 and a second inverter 123-2 when a cause of the failure in the first steering control module 110 and the second steering control module 120 occurs in a first inverter 113-2 and a second inverter 123-2 controlling a first reaction force motor 23-1 or a second reaction force motor.

The first inverter 113-2 may include a first high-side switching element 410 and a first low-side switching element 440 connected to the U phase of the first reaction force motor 23-1, a second high-side switching element 420 and a second low-side switching element 450 connected to the V phase of the steering motor, and a third high-side switching element 430 and a third low-side switching element 460 connected to the W phase of the steering motor. By the nature of the redundant system, the second inverter 123-2 may have the same structure as the first inverter 113-2.

When at least one of the plurality of switching elements included in the first inverter 113-2 fails, the failure detection step S710 may determine that the first inverter 113-2 fails.

The reaction force torque may be set to a higher value as the on-duty ratio of the first inverter 113-2 is set to be higher.

Figure 8:
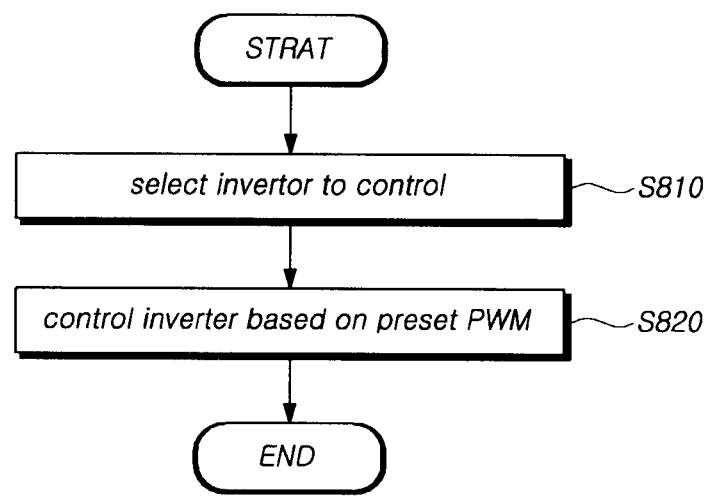
FIG. 8 is a view more specifically illustrating step S720 according to an embodiment.

FIG. 8 is a view more specifically illustrating step S720 according to an embodiment.

Referring to FIG. 8, the steering control device 10 may select an inverter to control (S810). The steering control device 10 may select a different inverter depending on the failure context of the first inverter 113-2 and the second inverter 123-2. When at least one of the plurality of switching elements included in the first inverter 113-2 fails, the steering control device 10 may determine that the first inverter 113-2 fails. This method may be equally applied to the second inverter 123-2.

As an example, when a phase failure occurs in the first inverter 113-2 and the second inverter 123-2, the steering control device 10 may generate reaction force torque by conducting the inverter with fewer failed phases of the first inverter 113-2 and the second inverter 123-2. When two phases fail in the second inverter 123-2, and one phase fails in the first inverter 113-2, the steering control device 10 may generate reaction force torque by conducting the first inverter 113-2. For example, when the fourth high-side switching element corresponding to the U phase of the second inverter 123-2 and the fifth low-side switching element corresponding to the V phase fail, and the first high-side switching element 410 corresponding to the U phase of the first inverter 113-2 fails, one phase fails in the first inverter 113-2, and two phases fail in the second inverter 123-2, so that the steering control device 10 may control to conduct the first inverter 113-2.

Accordingly, when the first high-side switching element 410 fails, the steering control device 10 may control at least one of the second high-side switching element 420 and the third high-side switching element 430 to conduct the first inverter 113-2.

The steering control device 10 may control the inverter based on preset pulse width modulation (PWM) (S820).

Here, the preset PWM may be set based on the vehicle velocity. In other words, the PWM may be set to differ depending on the vehicle velocity.

As described above, according to the disclosure, the steering control device and method may generate a reaction force torque to the steering wheel by controlling a non-failed switching element when the reaction force motor cannot be controlled due to failure in both the inverters, thereby providing a steering feeling to the driver.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device, comprising:
   a first steering control module controlling a first reaction force motor to generate a reaction force torque for a steering wheel through a first inverter; and
   a second steering control module controlling a second reaction force motor to generate a reaction force torque for the steering wheel through a second inverter,
   wherein the first steering control module or the second steering control module generates the reaction force torque by conducting one of the first inverter and the second inverter when the first inverter and the second inverter fail.

2. The steering control device of claim 1, wherein the first inverter includes a first high-side switching element and a first low-side switching element connected to a U phase of the first reaction force motor, a second high-side switching element and a second low-side switching element connected to a V phase of a steering motor, and a third high-side switching element and a third low-side switching element connected to a W phase of the steering motor.

3. The steering control device of claim 2, wherein the first steering control module determines that the first inverter fails when at least one of a plurality of switching elements included in the first inverter fails.

4. The steering control device of claim 3, wherein the first steering control module conducts the first inverter by controlling at least one of switching elements of remaining phases positioned on the same end with respect to the failed switching element.

5. The steering control device of claim 4, wherein the reaction force torque is set to a higher value as an on-duty ratio of the first inverter is set to be higher.

6. The steering control device of claim 1, wherein the first steering control module controls the first inverter based on preset pulse width modulation (PWM).

7. The steering control device of claim 6, wherein the preset PWM is set based on a velocity of a vehicle.

8. The steering control device of claim 1, wherein the first steering control module generates the reaction force torque by conducting an inverter with fewer failed phases of the first inverter and the second inverter when a phase failure occurs in the first inverter and the second inverter.

9. A steering control method, comprising:
   a failure detection step of detecting a failure in a first steering control module and a second steering control module; and
   a reaction force torque generation step generating a reaction force torque to for a steering wheel by conducting one of a first inverter and a second inverter when a cause of the failure in the first steering control module and the second steering control module occurs in a first inverter and a second inverter controlling a first reaction force motor or a second reaction force motor.

10. The steering control method of claim 9, wherein the first inverter includes a first high-side switching element and a first low-side switching element connected to a U phase of the first reaction force motor, a second high-side switching element and a second low-side switching element connected to a V phase of a steering motor, and a third high-side switching element and a third low-side switching element connected to a W phase of the steering motor.

11. The steering control method of claim 10, wherein the failure detection step determines that the first inverter fails when at least one of a plurality of switching elements included in the first inverter fails.

12. The steering control method of claim 11, wherein the reaction force torque generation step conducts the first inverter by controlling at least one of switching elements of remaining phases positioned on the same end with respect to the failed switching element.

13. The steering control method of claim 12, wherein the reaction force torque is set to a higher value as an on-duty ratio of the first inverter is set to be higher.

14. The steering control method of claim 9, wherein the reaction force torque generation step controls the first inverter based on preset pulse width modulation (PWM).

15. The steering control method of claim 14, wherein the preset PWM is set based on a velocity of a vehicle.

16. The steering control method of claim 9, wherein the reaction force torque generation step generates the reaction force torque by conducting an inverter with fewer failed phases of the first inverter and the second inverter when a phase failure occurs in the first inverter and the second inverter.

* * * * *